W. R. LITZENBERG.
POWER SHOVEL.
APPLICATION FILED SEPT. 14, 1912.
1,083,625.
Patented Jan. 6, 1914.
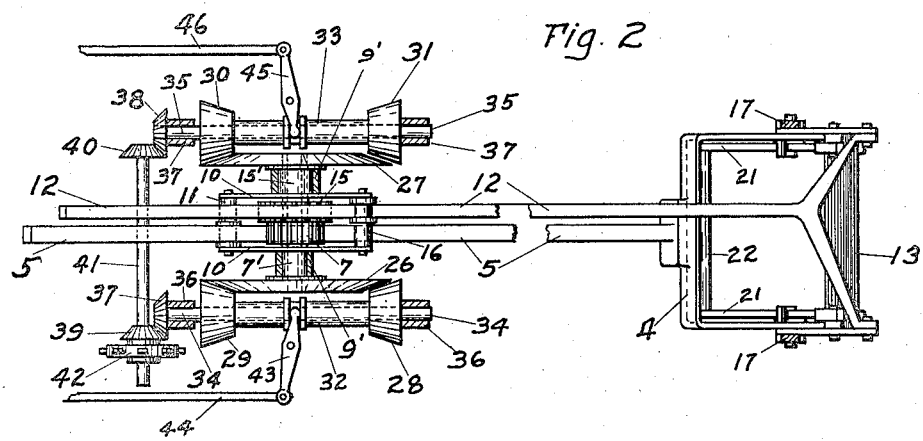
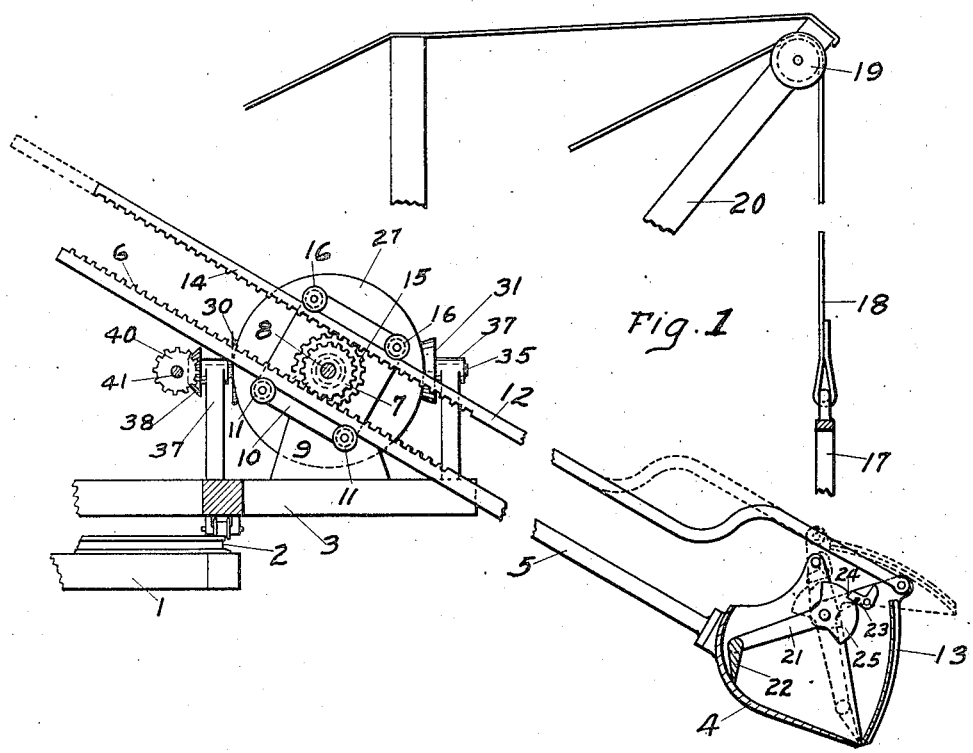
Witnesses
F. A. Bullington
Warren P. Smith
Inventor.
W. R. Litzenberg.

UNITED STATES PATENT OFFICE.

WILLIAM R. LITZENBERG, OF PORTLAND, OREGON.

POWER-SHOVEL.

1,083,625.  Specification of Letters Patent.  Patented Jan. 6, 1914.

Application filed September 14, 1912. Serial No. 720,407.

*To all whom it may concern:*

Be it known that I, WILLIAM R. LITZENBERG, a citizen of the United States, residing in the city of Portland, county of Multnomah, and State of Oregon, have invented certain new and useful Improvements in Power-Shovels, of which the following is a specification.

My invention relates to power shovels, and more particularly to a shovel or spade-like element mounted at the end of an operating shaft or member, pivotally mounted upon or in a power transmission element or mechanism, by means of which it is power-moved longitudinally into the earth, or other matter to be moved, in much the same manner as an ordinary hand shovel or spade is forced into the earth.

Among the salient objects of my invention are,—to provide a power-actuated two-part shovel or spade which can be moved into various operative positions about a horizontal axis constituting a pivotal bearing and which can be mechanically thrust longitudinally into the earth, or other matter to be moved, for the purpose of taking up a load thereof; to provide in such a device a power transmission element or mechanism to serve both as a pivotal bearing support for the shovel handle, and as a means for applying power thereto for forcing one part of the shovel longitudinally into the earth, and the other part thereof down over the load about to be lifted by the shovel, whereby to retain the full load therein as said shovel is lifted upon its pivotal support to any desired discharging or emptying position; to provide in such a device means for operating said cover or hood at will and independently of the movement of the shovel or spade, with an ejecting element for forcibly ejecting or discharging the load therefrom; to provide in combination with such a machine, power furnishing mechanism with connections therefrom for driving said pivotal transmission mechanism and also for lifting and lowering the shovel thereof with its load; to provide in a device of the character referred to a suitable carriage support, or turn table, whereby said shovel can be moved bodily about a vertical axis into different operative positions, and, in general, to provide a simple, practicable and effective power shovel or spade like machine which can be power operated substantially in the same manner as is a hand spade or shovel manually operated.

In order that others may fully understand my invention, I have shown on the accompanying sheet of drawings for purposes of illustration, and will now describe, one practical embodiment thereof.

In the drawings, Figure 1 is a side elevation of one embodiment of the invention, with parts broken away and in section; and Fig. 2 is a top plan view of the same, with parts omitted, showing one form of driving or operating mechanism.

It is to be understood that the invention can be mounted upon and operated from any suitable carriage support, although it is desirable to mount it upon a movable platform or turn table base. I have, therefore, shown just a small portion of a supporting base, as 1, with track 2, upon which a supporting turn table 3 is movably mounted. My shovel or spade is designated as 4 and is mounted at the end of an operating shaft or member 5, provided with teeth 6, which mesh with the teeth of an operating or driving gear 7, mounted upon a shaft 8 in a manner hereinafter referred to, in a frame or standard 9, upon the turn table 3. Mounted upon said shaft 8 is a guide or holding frame 10, pivotally mounted, with anti-friction rollers 11—11 for retaining said operating shaft or member 5 in proper operating mesh with said driving gear 7, while at the same time permitting of its free rocking or pivotal movement about said shaft 8, and of its free longitudinal movement therethrough under the action of the gear 7 in either direction. Mounted through the upper portion of said retaining frame 10, preferably to one side of the shaft or member 5, is a second shaft or member 12, and attached at its lower end to the other part of said shovel, said part being designated 13 and constituting a cover or hood, hingedly mounted and adapted to be closed down upon the load after the shovel proper has been forced into the material to be moved, in the manner indicated in full lines, Fig. 1. Said operating shaft or handle 12 is also provided with operating teeth 14 upon its under side, in mesh with an operating gear 15. Anti-friction guide rollers 16—16 in the upper part of said frame 10 serve to hold said operating handle 12 in proper engagement with its driving gear 15, while at the same time permitting it to be moved with the shaft or member 5 about the supporting bearing shaft 8, as said shaft is lifted or lowered by means of a bail like element 17, attached to the opposite sides of said shovel and to a lifting cable 18, working over a suitable sheave wheel 19, mounted in the upper end of a fixed boom or frame, as 20, mounted upon turn table 3. This lifting cable extends to and is operable from the power furnishing mechanism in the usual manner for lifting and lowering the shovel.

I have also provided an ejector for discharging the load from the shovel. In the shown embodiment of the invention this comprises a member, as 21, with a hinged lip 22, adapted to be moved forwardly as the cover or hood is raised in such manner as to scrape the bottom of said shovel during the discharging operation. This is accomplished by means of pawls 23, upon the hood or cover 13, which engage in notches 24, provided for that purpose in the enlarged upper ends 25 of the opposite sides of said member 21. When said cover handle or shaft 12 is moved longitudinally into the position shown in dotted lines, Fig. 1, the cover or hood 13 is raised into the dotted line position, and the member 21 is moved forwardly, as indicated in dotted lines, ejecting or discharging the load from the shovel. As the shovel is lowered by means of the lifting cable 18 for another load, the cover or hood remains up. As the shovel is forced into the earth or other matter said member 21 and lip 22 are free to be moved therewith as the shovel is forced over the load until they rest in their proper positions. When the shovel has been thus forced into the matter full length, the cover or hood is forcibly closed down upon it by the longitudinal forward movement of its operating shaft or member 12, whereby to retain the load therein while the shovel is again lifted by the lifting bail and cable 18.

The operating gears 7 and 15 are adapted to be driven in either direction together or separately, as desired, for the operation of the shovel. As one practical method for driving these operating gears, I have shown and will now describe a series of friction driving elements, shown clearly in plan view, Fig. 2. In this form, said gears 7 and 15 are each mounted upon a sleeve as 7' and 15', which sleeves carry at their opposite ends friction disks, designated, respectively, 26 and 27, and said gears, sleeves and disks are rotatably mounted upon the shaft 8. The bearing supports or boxes of the frame or standards 9 for said shaft and sleeves are shown in section, and designated 9'—9', with the sleeves 7' and 15' rotatably mounted therein. As a means for driving said friction disks 26 and 27, I have provided two friction cones for each disk, designated, respectively, 28—29 and 30—31, mounted at the opposite ends of two sleeves slidably secured to bearing shafts 34—35, with bearings 36—36 and 37—37 at their opposite ends, said sleeves being splined to said shafts so as to turn therewith and at the same time be slidable thereupon to move the friction cones into bearing engagement with the friction disks 26 and 27, or into neutral position, as may be desired. Said shafts 34 and 35 are provided with driving gears, designated respectively, 37 and 38, which mesh with other gears 39 and 40, upon a driving shaft 41, driven by means of a sprocket wheel 42, which may be driven by a sprocket chain from any suitable power furnishing mechanism.

As a means for shifting the friction cones 28 and 29 into and out of frictional engagement with the friction disk 26, I provide a shifting mechanism comprising a lever 43 and a rod 44, and for shifting the friction cones 30 and 31 into and out of frictional engagement with the friction disk 27, similar shifting mechanism is provided, comprising a lever 45 and a rod 46. These operating rods 44 and 46 may be extended to any convenient operating position, whereby the operator can easily manipulate said friction driving mechanism as desired, and so as to move the shovel operating shafts or members 5 and 12 in either direction, either together or separately, and to any desired distance.

It is to be understood that any mechanically operated transmission mechanism may be used for pivotally supporting and moving longitudinally the shovel operating shafts or members, and that any kind of power furnishing mechanism may be used, as may be most practicable under the particular circumstances, and while I have shown and described but one embodiment of the invention, I am aware that modifications and changes can be made therein without departing from the spirit of the invention, and I do not, therefore, limit the invention to the particular forms here shown, except as I may be limited by a broad interpretation of the language used in the hereto appended claims.

I claim:

1. In a power-shovel, a shovel body, an ejector pivotally mounted therein, a supporting and operating arm therefor pivotally mounted intermediate its ends and comprising two shafts connected at their outer ends to the shovel and ejector, respectively, power-transmission mechanism, and operating connections through the pivotal mounting with said shafts for moving them longitudinally in either direction, together or independently, for operating said shovel and ejector.

2. A power shovel comprising in combination, a suitable carriage support, a combination pivotal and power-transmission mechanism thereupon, a two-part shovel, one part of which is adapted to be thrust into the earth and the other part of which is hingedly mounted and adapted to be forced down over said first part, and a supporting and operating arm structure for said shovel comprising two shafts attached at their lower ends to the respective parts of said shovel and having operative connections through said pivotal and power-transmission mechanism, whereby to be moved longitudinally in either direction together or independently of each other, in the operation of said shovel.

3. A power shovel comprising in combination a two-part shovel, an ejector mounted therein, operating connections between said ejector and one of said shovel parts, a supporting and operating arm for said shovel pivotally mounted and comprising two shafts movable longitudinally and connected at their outer ends to the respective parts of said shovel, power-transmission mechanism, and operating connections to said shafts for mechanically moving them longitudinally in either direction to operate said shovel.

4. A power shovel comprising in combination, a carriage support, a combination pivotal and power-transmission mechanism thereupon, a two-part shovel, one part of which is adapted to be forced into the earth and the other part of which is hingedly mounted and adapted to be forced down over said first part, an ejector pivotally mounted therein and operable with the opening movement of said hinged shovel part, and a supporting and operating arm for said shovel comprising two shafts attached at their lower ends to the respective parts of said shovel and having operative connections through said pivotal and power transmission mechanism, whereby to be moved longitudinally in either direction together or independently of each other in the operation of said shovel.

5. In a power shovel, in combination, a revolubly mounted carriage support with boom frame, power-transmission mechanism, a supporting and operating arm pivotally mounted through said power-transmission mechanism and comprising a pair of shafts movable longitudinally together or independently of each other, a two-part shovel mounted upon said arm, one of its parts being hingedly mounted and adapted to be closed down over the other part, an ejector therein, operative connections between said movable part and one of said shafts, operative connections between said power-transmission mechanism and said shafts for mechanically moving the latter together or independently of each other longitudinally in either direction, and means for lifting said shovel from said boom frame, substantially as described.

6. In a power shovel, in combination, a two-part shovel, one part of which is adapted to be thrust into the earth or other material, and the other part of which is pivotally mounted and adapted to be closed down thereupon, a supporting arm comprising two shafts pivotally and adjustably supported intermediate their ends and connected at their outer ends with the respective parts of said shovel, power-transmission mechanism for moving said shafts longitudinally in either direction, and lifting means for lifting said shovel upon the pivotal support for said supporting arm.

7. A power shovel comprising in combination, a support, a combination pivotal and power-transmission mechanism thereupon, a two-part shovel with the parts thereof hinged together, a supporting arm structure therefor comprising a pair of operating shafts connected respectively at their lower ends to the parts of said shovel, said operating shafts passing through said pivotal and power-transmission mechanism and adapted to be mechanically operated thereby together or independently of each other in either direction, and lifting means for lifting said shovel and supporting arm structure upon its pivotal support, substantially as described.

WILLIAM R. LITZENBERG.

In presence of—
 W<small>M</small>. W<small>ATSON</small>,
 G. A. N<small>ICHOLS</small>.